United States Patent [19]

Darling

[11] Patent Number: 4,693,938

[45] Date of Patent: Sep. 15, 1987

[54] FOAM SHELL CRYOGENIC ICF TARGET

[75] Inventor: Dale H. Darling, Pleasanton, Calif.

[73] Assignee: The United States of America as represented by the United States Department of Energy, Washington, D.C.

[21] Appl. No.: 927,995

[22] Filed: Nov. 7, 1986

[51] Int. Cl.$^4$ .......................... G21B 1/00; A61N 5/12; B32B 5/18; B32B 9/00

[52] U.S. Cl. ..................................... 428/403; 376/152; 376/915; 376/916; 427/5; 427/215; 427/222; 428/404; 428/407

[58] Field of Search ........................ 376/152, 915, 916; 427/5, 6, 215, 222; 428/402, 403, 404, 407

[56] References Cited

U.S. PATENT DOCUMENTS

| | | | |
|---|---|---|---|
| 4,012,265 | 3/1977 | Rinde | 376/152 |
| 4,021,280 | 5/1977 | Rinde et al. | 376/152 |
| 4,034,032 | 7/1977 | Hendricks | 428/403 |
| 4,092,381 | 5/1978 | Halpern et al. | 376/152 |
| 4,190,016 | 2/1980 | Hendricks | 427/6 |
| 4,221,186 | 9/1980 | Woerner | 118/724 |
| 4,234,659 | 11/1980 | Kostandov et al. | 428/403 |
| 4,268,558 | 5/1981 | Boardman | 428/403 |
| 4,376,752 | 3/1983 | Nuckolls et al. | 376/152 |
| 4,432,933 | 2/1984 | Teitel et al. | 376/152 |
| 4,525,323 | 6/1985 | Bangerter et al. | 376/152 |

Primary Examiner—William J. Van Balen
Attorney, Agent, or Firm—Henry P. Sartorio; L. E. Carnahan; Judson R. Hightower

[57] ABSTRACT

A uniform cryogenic layer of DT fuel is maintained in a fusion target having a low density, small pore size, low Z rigid foam shell saturated with liquid DT fuel. Capillary action prevents gravitational slumping of the fuel layer. The saturated shell may be cooled to produce a solid fuel layer.

10 Claims, 3 Drawing Figures

10

12 LOW DENSITY, LOW Z FOAM SATURATED WITH LIQUID DT PROVIDES BOTH ABLATOR AND FUEL

16 EQUILIBRIUM DT VAPOR PRESSURE PROVIDES IGNITION HOT SPOT

14 THIN PROTECTIVE MEMBRANE PROVIDES A VAPOR BARRIER TO PREVENT DT BOIL OFF

FOAM SHELL CRYOGENIC ICF TARGET

The U.S Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention relates generally to inertial confinement fusion targets and more particularly to cryogenic targets for laser fusion.

High gain inertial confinement fusion (ICF) targets include condensed deuterium tritium (DT) fuel layers on the interior of a shell in a fuel capsule. These targets can be achieved at cryogenic temperatures, and the fuel layer may be either solid or liquid. Ideally, such a target should have a condensed fuel layer which is uniform and smooth, typically up to several hundred microns in thickness. However, in practice, such a fuel capsule is difficult to fabricate. The action of gravity causes the DT to slump while liquid, producing a sagged nonuniform layer. Gravitational slumping of the layer is a problem even if the final configuration is a solid layer, since it must pass through the liquid state as it cools.

U.S. Pat. Nos. 4,221,186 and 4,190,016 describe methods of forming cryogenic targets using a heat pulse in a freezing cell or cold gas jets, respectively. These methods, however, do not address the problem of gravitational slumping of the cryogenic layer.

A number of approaches to fabricating thick, homogeneous, cryogenic shells have been suggested, including: fast refreeze, refreeze in zero gravity, vibration centering inside a solid shell, inhomogeneous static electric field centering, thermal gradient centering, layer healing via distillation from self heating, cryogenic hemishell formation and assembly, and the application of droplet generator technology. All these methods appear to be long-term, high risk and expensive.

Other laser fusion target designs have utilizied foam layers. U.S. Pat. No. 4,012,265 shows a low density microcellular foam and metnod of making same which may be used to encapsulate a laser target, i.e., the foam is outside the fuel. U.S. Pat. No. 4,092,381 discloses a laser fusion target comprising a porous foam of deuterated hydrocarbon material, particularly deuterated polyethylene. Neither of these targets include a cryogenic layer of DT and neither address the problem of gravitational sagging.

SUMMARY OF THE INVENTION

Accordingly, it is an object of the invention to provide a fusion target having a uniform cryogenic layer of DT.

It is another object of the invention to provide a new target approach that utilizes a passive mechanism for producing highly uniform spherically symmetrical cryogenic DT layers.

It is also an object of the invention to provide cryogenic targets with a uniform DT layer which are economical to produce and may be produced in large quantities.

The invention is a single shell cryogenic fusion target made of a small pore size, low density, low-Z rigid foam saturated witn liquid DT. The open cell foam matrix acts as a sponge and precisely defines the liquid layer contours and stabilizes the liquid layer against gravitational slumping, passively countering gravitational effects by capillary action. The DT wetted foam shell may also be covered by a thin protective membrane which provides a vapor barrier. The foam shell saturated with liquid DT provides an ablator as well as a fuel which enables smaller target aspect ratios (shell inner radius/shell thickness). Since the target is operated at liquid DT temperatures, gaseous DT at equilibrium vapor pressure fills the hollow center of the sphere providing an ignition hot spot which aids fusion ignition. The saturated foam layer can be cooled to a temperature at which the DT becomes solid.

DETAILED DESCRIPTION

The invention is a fusion target which employs a rigid foam matrix to support liquid or solid deuterium-tritium (DT) fuel in a spherical shell configuration. Capillary forces generated by the DT wetting the foam matrix stabilize the liquid against gravitational flow. Thus, a high gain target is achieved in which the bulk of the DT fuel is present as a condensed uniform layer on the interior surface of the capsule with the remaining interior volume of the capsule filled with DT vapor at equilibrium pressure. The condensed fuel layer is at cryogenic temperatures and may be either solid or liquid depending on the DT vapor density desired inside the capsule.

Figure 1:
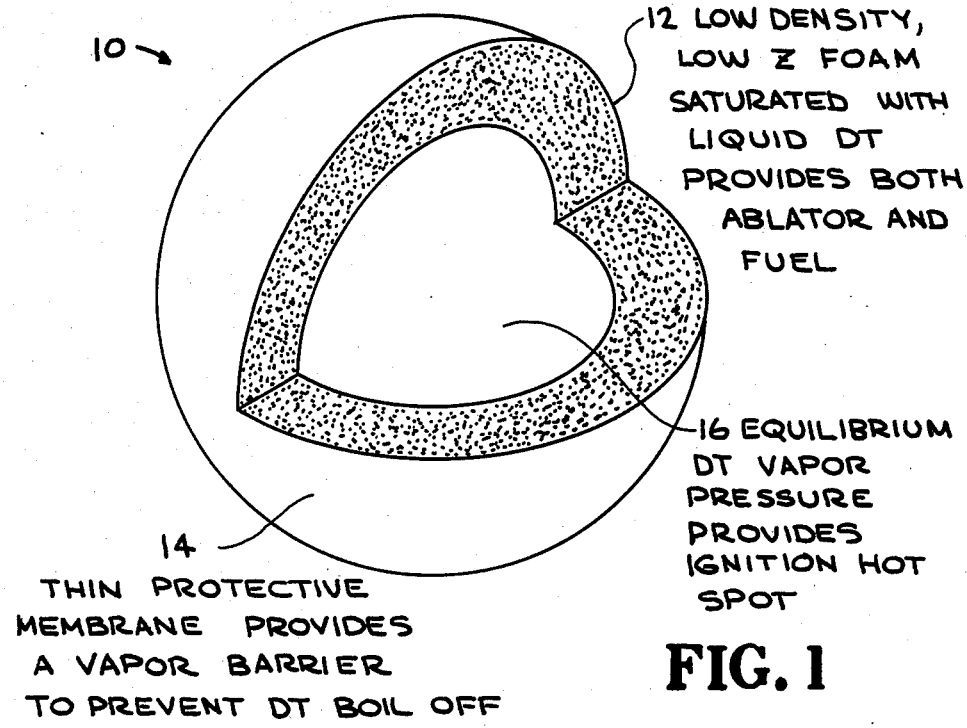
FIG. 1 is a perspective view partly in section of a single shell cryogenic target made of low density, low-Z foam saturated with liquid DT.

A wetted foam shell target 10, as shown in FIG. 1, is made of a spherical foam shell 12 which acts as a sponge and is wetted with liquid DT. The saturated foam shell 12 serves as an ablator and tamper as well as a fuel layer. To serve as a capsule material the foam must be open cell, have a high pore volume and have sufficient mechanical strength. To minimize energy loss due to bremsstrahlung radiation during ignition and burn propagation, the foam in the fuel region should be both low density and low atomic number (Z). Calculations predict that direct drive capsules composed of DT saturated plastic foam can achieve gains of 100–200 for incident laser energy at 200–700 kJ.

The liquid DT is supported in the foam structure against gravity by capillary pressure. For a wetted foam capsule, the pore size of the foam sponge must be small enough to support a liquid column of DT of the order of the capsule diameter against a maximum acceleration experienced by the capsule during injection into a fusion reactor. Capsule diameters may range up to 0.5 cm. A pore size of 1 micron is sufficient to provide stability when subjected to accelerations up to 10 km/s$^2$ (1000 g); however, because of the stresses generated by capillary pressure in small pore materials the minimum pore size will be determined by the mechanical strength of the foam material.

The saturated foam shell 12 can be surrounded by an optional thin protective membrane 14 which provides a vapor barrier to prevent DT boil off. The protective membrane 14 may be a 5 micron thick plastic or polymer layer formed on the saturated foam shell 12. The hollow interior region 16 of the target 10 will be filled with DT vapor at an equilibrium pressure with the liquid or solid DT in the foam shell 12. In operation the DT vapor in the center of target 10 provides an ignition not spot which assists in fusion ignition.

A variety of foam materials can be utilized to form a saturated foam shell target according to the invention. Spherical shells of silica aerogel can be machined. A silica alcogel having a density of 0.06 g/cc is prepared by rapidly adding a solution of 14.9 g $H_2O$, 75.5 g $CH_3OH$, 1.25 cc concentrated $NH_4OH$ at a temperature of $-20°$ C. to a solution of 29.2 g $Si(OCH_3)_4$ and 75 g $CH_3OH$, stirring the two solutions for 10 minutes and pouring the mixture into molds at 25° C. After about 50 minutes, a strong crystal clear alcogel is produced. Another method of making a low density polymer foam material with a density of about 50 mg/cc and cell sizes of about 1 micron is by a gelation crystallization process followed by supercritical extraction. A high molecular weight polymer, preferably polyethylene, is dissolved in a solvent such as tetralin to form an entangled macromolecular gel above the polymer crystal melting point. The solution is then cooled to maximize the concentration of crystalline nuclei. The polymer gel is then supercritically dried to prevent cell collapse by first exchanging the alcohol with liquid $CO_2$ and then heating to above the critical point and venting to remove the $CO_2$. A cellular foam can also be made by a process of inverse emulsion in which an inverse emulsion of water in oil, 5–10 weight percent oil, is first produced. The oil phase is then polymerized and the emulsion is dried, producing a continuous foam with a density of about 0.05–0.10 g/cm$^3$ and a cell size of about 5–30 microns. U.S. Pat. No. 4,012,265 to Rinde also shows a method for making a low density microcellular foam.

The foam capsules, according to the invention, have a number of advantages for providing high gain laser fusion targets. A passive mechanism is used to form a liquid fuel layer; capillary action in a foam matrix prevents gravitational slumping of liquid DT saturating the matrix to maintain a uniform fuel layer. Relatively easy characterization of the capsule is possible. The capsule can be subject to multiple-G acceleration forces without fuel slumping which may be significant if the capsules are injected into a reactor. The capsules can be formed by mass production techniques as will be further described below. The wetted foam serves as an ablator as well as a fuel layer, thus simplifying target design.

Figure 2:
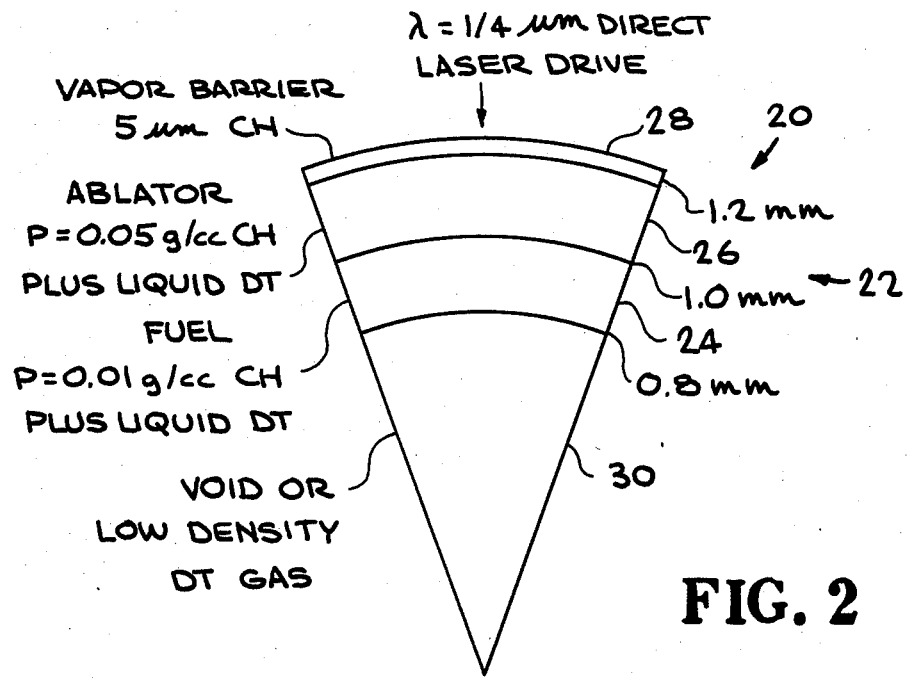
FIG. 2 is a pie diagram of a saturated foam shell target having separate ablator and fuel zones.

In an alternate embodiment of the invention, as shown in FIG. 2, a wetted foam shell 22 of fusion target 20 is made up of a pair of abutting distinct zones, an inner fuel zone 24 and an outer ablator zone 26 of different densities. As an example, the fuel zone 24 is made of an 0.01 g/cc polymer foam saturated with liquid DT while the ablator zone 26 is made of an 0.05 g/cc polymer foam saturated with liquid DT. A five micron polymer vapor barrier 28 may surround the foam shell 22 and the inner void region 30 of target 20 may be filled with low density DT gas. In a typical embodiment the inside radius of fuel zone 24 is 0.8 mm and the outer radius is 1.0 mm while the outer radius of ablator zone 26 is 1.2 mm.

Saturated foam shell targets can be fabricated by mass production techniques and at low unit cost for use in a fusion reactor. Two possible approaches to capsule production are to utilize droplet generator formation techniques to mass produce hollow foam shells or to use batch molding over evaporable spherical mandrels. Of course, single shells can be made by hand by machining foam material. Once formed, the capsules are filled with DT either by diffusion at room temperature through a thin permeable overcoat layer on the capsule or by direct liquid filling of the capsule while at cryogenic temperature. After filling, the capsules are transported to the fusion reactor; in an operating reactor the capsules would be injected with a high velocity into the target chamber. Of course, in an experiment, single targets can be placed in a target chamber.

Figure 3:
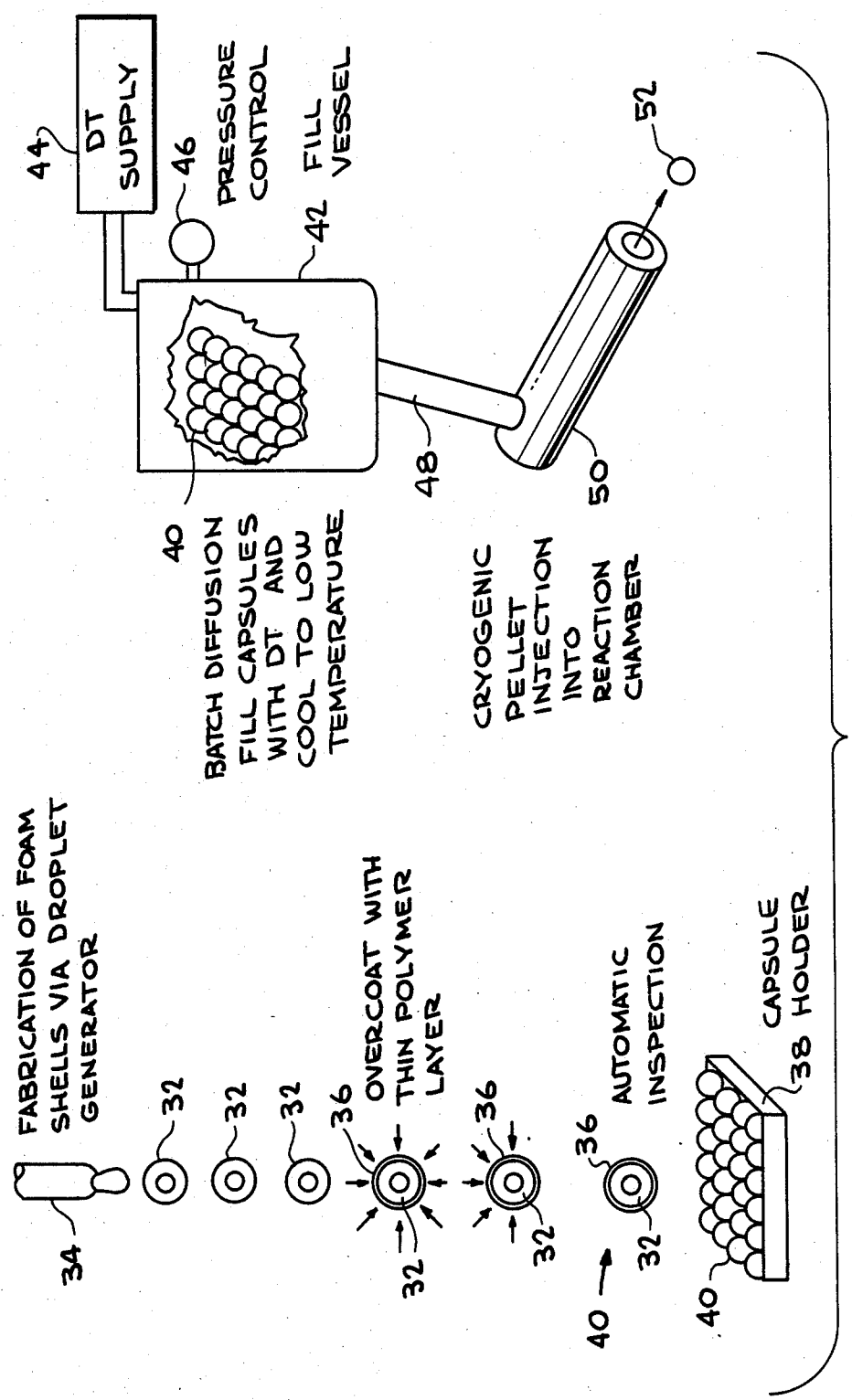
FIG. 3 is a schematic diagram of a batch process for manufacturing saturated foam shell targets.

A schematic view of an overall fabrication process is shown in FIG. 3. Spherical shells 32 are formed by a droplet generator 34. The spherical shells 32 are overcoated with a thin polymer layer 36 to form coated shells 40. After automatic inspection the coated spherical shells 40 are collected in capsule holder 38. A batch of the coated shells 40 are placed in a fill vessel 42 which is connected to a DT supply 44. Pressure control means 46 are associated with fill vessel 42 for the very careful pressure control that is required. After the coated capsules 40 are diffusion filled with DT and cooled to a low temperature where the DT is either liquid or solid the targets 52 are removed through outlet means 48 and placed in an injector 50 for injecting into a fusion reactor.

Changes and modifications in the specifically described embodiments can be carried out without departing from the scope of the invention which is intended to be limited only by the scope of the appended claims.

I claim:

1. An inertial confinement fusion target comprising a hollow spherical shell of low density, low Z, open cell, rigid foam saturated with liquid DT.

2. The target of claim 1 further including a thin protective membrane formed on the foam shell.

3. The target of claim 1 further including gaseous DT filling the hollow center of the spherical shell at an equilibrium vapor pressure.

4. The target of claim 1 wherein the spherical shell is divided into an inner fuel zone and an abutting outer ablator zone, the foam of the fuel zone having a lower density than the foam of the ablator zone.

5. The target of claim 1 wherein the spherical shell of rigid foam has a density in the range of 0.01–0.10 g/cc and a pore size of about 0.01–1.0 micron.

6. A method of preventing gravitational slumping of a cryogenic layer of DT fuel in a fusion target comprising:
   forming a hollow spherical shell of low density, low Z, open cell rigid foam;
   saturating the foam shell with liquid DT.

7. The method of claim 6 wherein the step of saturating the foam shell with liquid DT is performed by diffusing gaseous DT into the foam shell and cooling the gaseous DT.

8. The method of claim 6 wherein the step of saturating the foam shell with liquid DT is performed by wicking liquid DT into the foam shell.

9. The method of claim 6 further including cooling the saturated foam shell to solidify the DT.

10. The method of claim 6 wherein the foam shell is produced of a foam having a density of about 0.01–0.10 g/cc and a pore size of about 0.01–1.0 micron.

* * * * *